March 16, 1937.  L. E. HOLLAND  2,074,220
APPARATUS FOR ELECTRICAL ETCHING
Filed Nov. 23, 1933   4 Sheets-Sheet 1

INVENTOR
Louis E. Holland.
BY
ATTORNEY

March 16, 1937. L. E. HOLLAND 2,074,220
APPARATUS FOR ELECTRICAL ETCHING
Filed Nov. 23, 1933 4 Sheets-Sheet 2
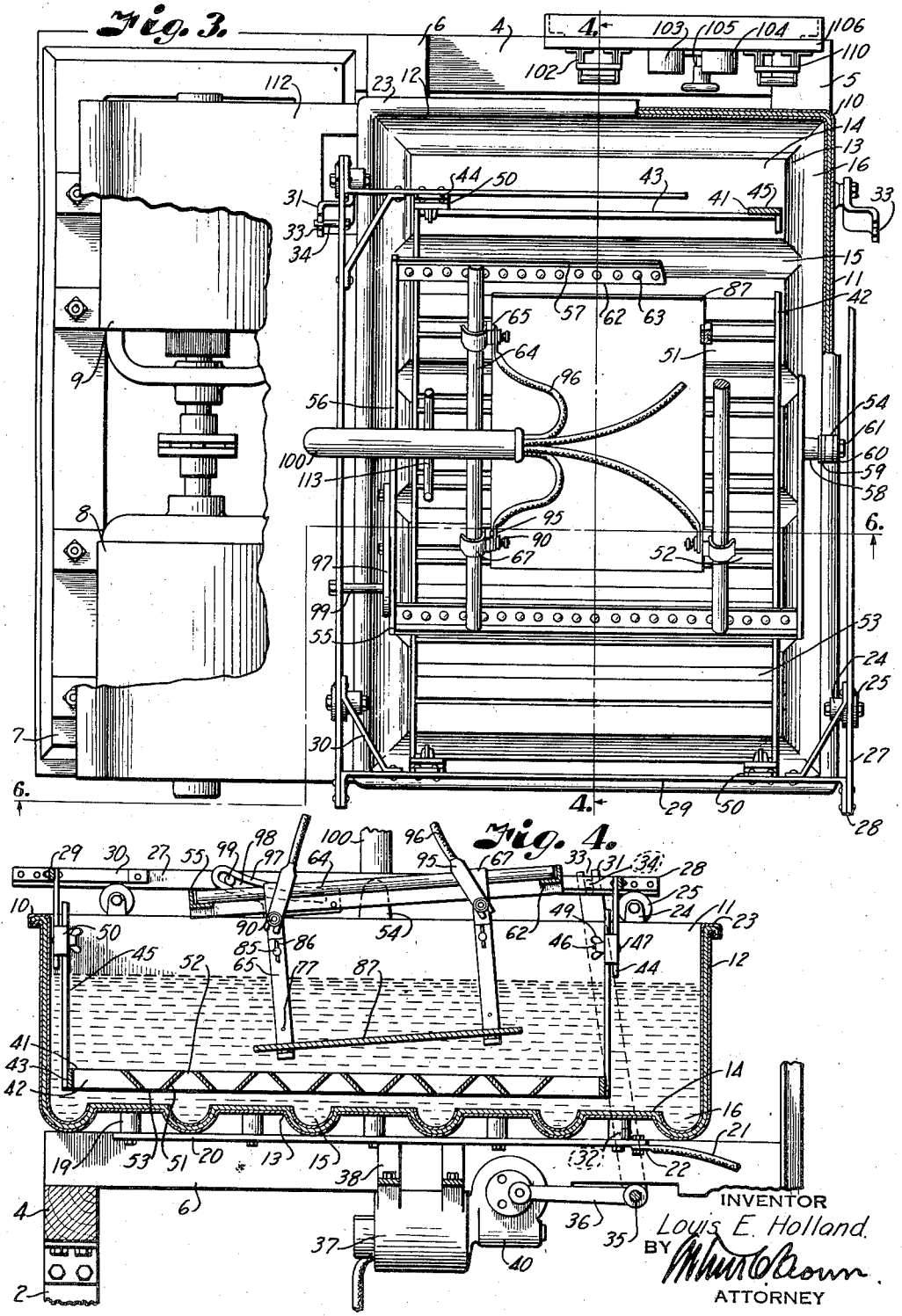
INVENTOR
Louis E. Holland
BY
ATTORNEY March 16, 1937.  L. E. HOLLAND  2,074,220
APPARATUS FOR ELECTRICAL ETCHING
Filed Nov. 23, 1933  4 Sheets-Sheet 3
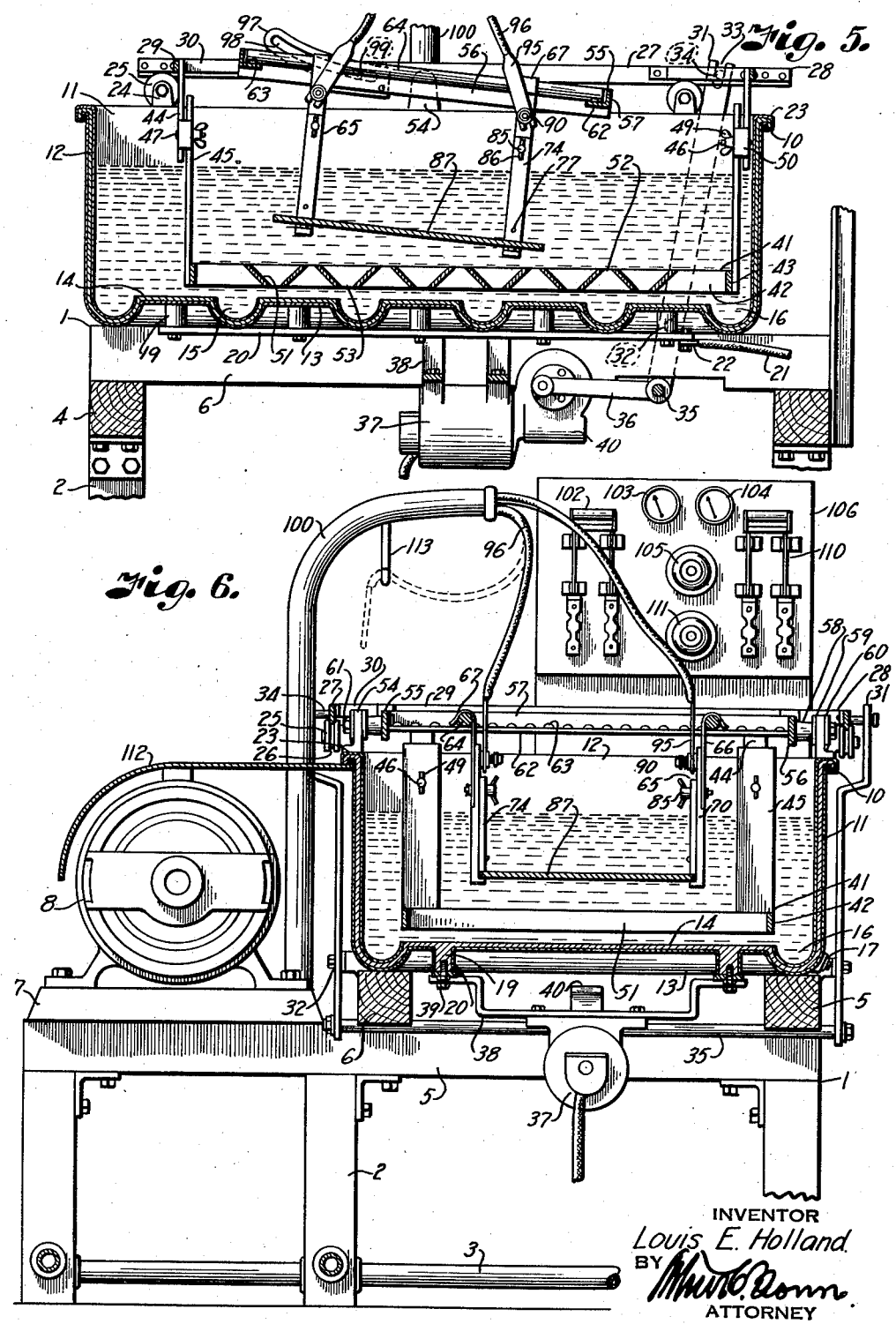
INVENTOR
Louis E. Holland
BY
ATTORNEY March 16, 1937.  L. E. HOLLAND  2,074,220
APPARATUS FOR ELECTRICAL ETCHING
Filed Nov. 23, 1933  4 Sheets-Sheet 4

INVENTOR
Louis E. Holland.
BY
ATTORNEY

Patented Mar. 16, 1937

2,074,220

UNITED STATES PATENT OFFICE 2,074,220

APPARATUS FOR ELECTRICAL ETCHING

Louis E. Holland, Kansas City, Mo.

Application November 23, 1933, Serial No. 699,365

8 Claims. (Cl. 204—5)

My invention relates to an apparatus for electrical etching.

In electrical etching as heretofore practiced, it has been customary to immerse a plate to be etched in a bath of electrolyte and pass current through the plate and bath to a cathode, also immersed in the electrolyte, so that portions of the plate exposed to the electrolyte are dissociated from the plate to produce the etching; the plate in some instances being reciprocated in a horizontal plane within the bath to wash particles of metal, dissociated from exposed portions of the plate by the electrochemical action, from the plate to speed up the operation and produce more regular lines of etching.

I have discovered that by agitating the electrolyte relative to the plate, particularly with a jetting action, washing of the dissociated particles from the plate and removal of such particles from the region of the plate is facilitated and, because of such constant exposure of the surface to be etched to clean electrolyte, thus further reducing the time required for the etching operation and improving quality of the plate, and that rapid, effective removal of the dissociated particles is promoted by tilting of the plate reversely to flow of the electrolyte to provide more direct contact of the electrolyte with the surface to be etched.

It is, therefore, the object of my invention to provide the improved method of etching last above described, and improved apparatus for use in practicing the method.

In accomplishing such objects I have provided improved details of structure, the preferred form of which is illustrated in the accompanying drawings, wherein:

Fig. 3 is a plan view of the apparatus, a part of the tank and agitator being broken away for better illustration, and the motor-generator guard being broken away to illustrate the driving connection between the motor and generator.

Fig. 4 is a central longitudinal section on the line 4—4, Fig. 3, the agitator and plate being shown at the beginning of their stroke.

Fig. 5 is a similar longitudinal section, the agitator and plate being shown at the completion of their stroke.

Fig. 6 is a transverse section on the line 6—6, Fig. 3.

Figure 1:
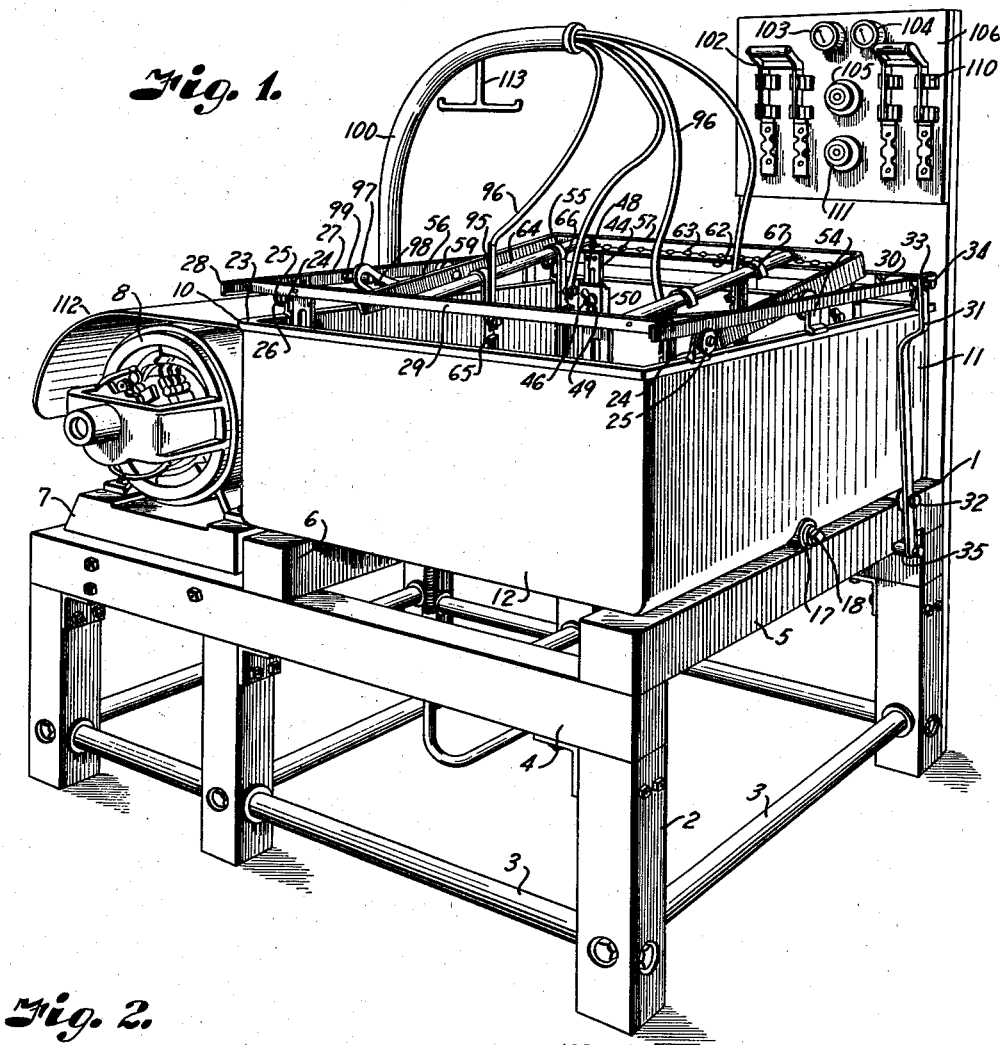
Fig. 1 is a perspective view of apparatus embodying my invention and with which my improved method may be practiced.
Figure 2:
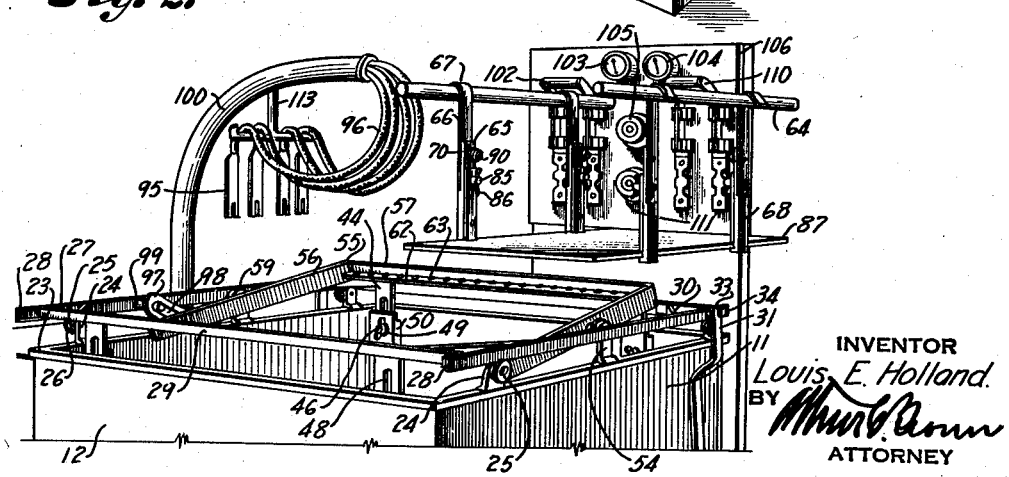
Fig. 2 is a similar view, showing the plate and plate holders removed from the tank.
Figure 7:
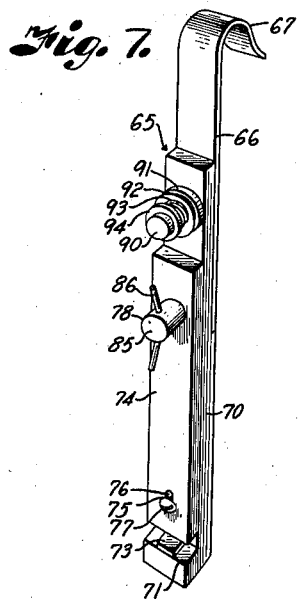
Fig. 7 is a detail perspective view of a preferred form of plate hanger arm.
Figure 8:
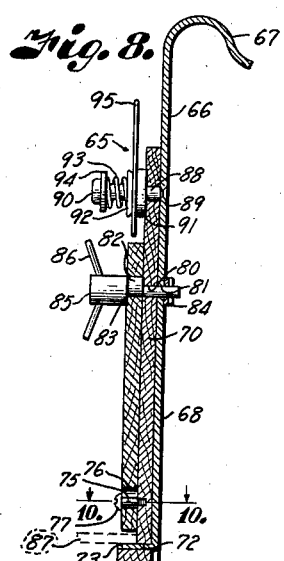
Fig. 8 is a central transverse section of the hanger arm.
Figure 9:
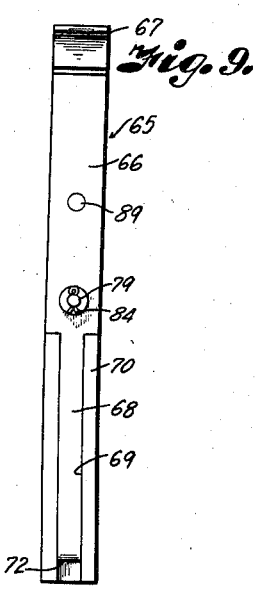
Fig. 9 is an elevation of the back of the hanger arm.
Figure 10:
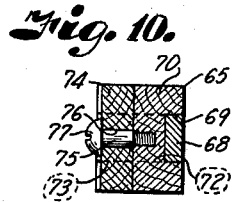
Fig. 10 is a cross sectional view of the hanger arm on the line 10—10, Fig. 8.
Figure 11:
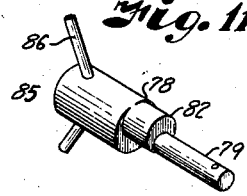
Fig. 11 is an enlarged detail perspective view of the clamp cam member of the plate hanger arm.
Figure 12:
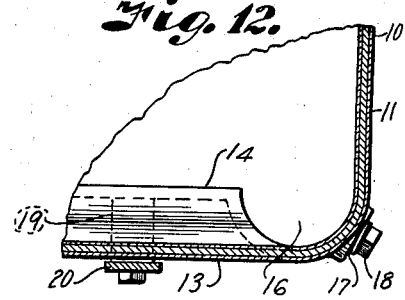
Fig. 12 is an enlarged sectional view of a lower corner of the tank, particularly illustrating the wall construction.
Figure 13:
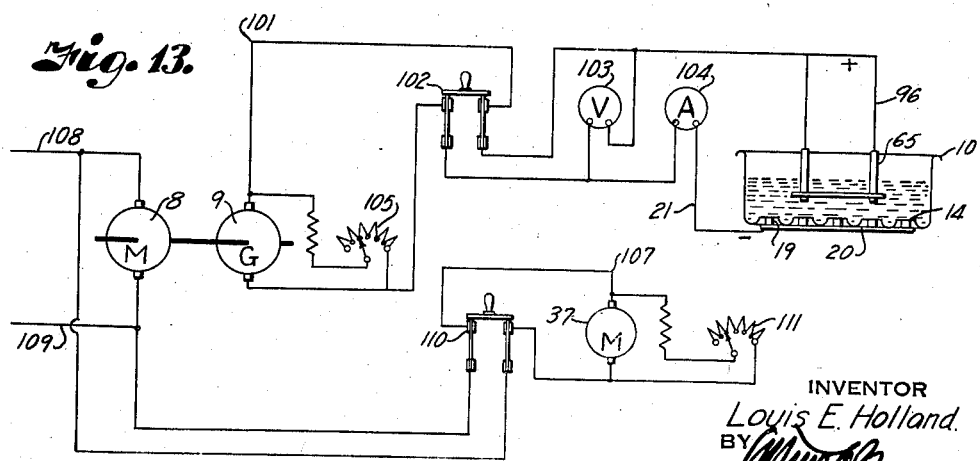
Fig. 13 is a wiring diagram.

Referring more in detail to the drawings:

1 designates a bench adapted for supporting an etching tank at a convenient elevation, preferably constructed of legs 2, tie rods 3, longitudinal sills 4 and cross sills 5, 6, the latter inset from one end of the bench to provide space for support of the base 7 on which a motor 8 and generator 9 may be mounted conveniently to an etching tank 10, removably supported on the cross sills 5, 6, to form a compact apparatus unit.

The tank 10 is preferably of improved construction consisting of integral side, end and bottom walls 11, 12 and 13, formed of cast iron or other conductive material, with the bottom formed to provide alternate, transverse, raised, plate-like sections 14 and connecting sump-trough sections 15, the latter terminating at the sides of the tank in a trough 16 extending entirely about the bottom of the tank, into which the sump troughs may empty for drainage of the electrolyte through an opening 17 normally closed by a screw plug 18. The entire exterior and interior surfaces of the side and end walls of the tank, the sump troughs 15 and the drain trough 16 are lined with non-corrosive material, such as porcelain, to protect the body of the tank from attack by the electrolyte, but the upper surfaces of the transverse, plate-like portions 14 of the tank body are unlined to expose such surfaces to the electrolyte so that they may constitute cathodes, as hereinafter described.

Terminal posts 19 are extended through the exterior lining to contact with the cathode plates, and provided at their outer ends with bus bars 20, with which the negative lead wires 21 of an electrical circuit are connected by clips 22.

Mounted on the rims 23 of the side walls of the tank are brackets 24 carrying rollers 25, having grooves 26 within which ride the side rails 27 of an agitator supporting frame 28 of rectangular construction, including end rails 29 riveted or otherwise secured to the side rails 27 and braced therefrom by corner strips 30, the end rails 29 being located well within the extended planes of the end walls of the tank to permit reciprocation of the agitator which is suspended from said end rails within the tank, as presently described.

Reciprocation of the frame 28, and the agitator suspended therefrom, is effected preferably by a pair of levers 31 fulcrumed on pins 32 attached to the cross sills 5, 6, and having slots 33 at their upper ends seating pins 34 projecting in alignment from opposite side rails 27 of the agitator supporting frame; the lower ends of the levers being connected wtih a cross rod 35 on a crank arm 36 operable from a motor 37, suspended below the tank by brackets 38, attached to the bottom of the tank by stud bolts 39, through speed reduction gearing, such as a worm shaft and wheel indicated by the housing 40.

The agitator proper includes a rectangular frame 41 formed of side rails 42 and end rails 43 suspended from the reciprocatory frame 28 by hangers including strips 44 attached to and depending from the end rails 29 of frame 28, and strips 45 attached to the end rails 43 of the agitator frame, overlapping corresponding strips 44 on the supporting frame and adjustably connected thereto by bolts 46 having head portions 47 slidable in slots 48 in the strips 44 and nuts 49 adapted for bearing against the inner faces of the strips 45 to tighten the strips 45 against the strips 44; the strips 45 being preferably provided with guides 50 for confining the strips 44 and assisting the thumb bolts in holding the adjustable strips in rigid relation.

Extending transversely between the side rails 42 of the agitator frame and secured thereto are blades 51 arranged in pairs, with the members of each pair converging upwardly but spaced apart to provide elongated transverse jet openings 52; the lower edges of the bars of adjacent pairs being likewise spaced to form bottom openings 53, whereby upon reciprocation of the agitator within the electrolyte contained within the tank, the electrolytic liquid will be delivered upwardly in elongated jets and angularly in a direction dependent upon direction of the movement of the agitator.

Mounted centrally on the rims 23 of the side walls of the tank are brackets 54 inset from the side rails 27 of the agitator supporting frame 28 to avoid interference therewith, and adapted for pivotally mounting a plate supporting frame 55, as hereinafter described.

The plate supporting frame 55 is preferably formed of strap metal with the sides 56 and ends 57 arranged edgewise and the side members provided wtih trunnions 58 rotatably mounted in the brackets 54 on the tank rim; collars 59 (Fig. 6) spacing the side members from the brackets; washers 60 providing additional bearing surface for the trunnions and the trunnions being locked to the brackets by nuts 61.

Extending inwardly from the lower edge of each of the end members 57 is a flange 62 having spaced bosses 63 on its upper face for selectively seating hanger rods 64 from which the plate hangers 65 are suspended. Each of the hangers 65 preferably includes a strip 66 of conductive material, such as copper, having a hook 67 at its upper end adapted to fit over one of the rods 64 and provided at its lower end with an extension 68 of reduced width adapted to fit within a longitudinal groove 69 in a body member 70 of fiber or other non-conductive material, having a laterally extending shelf 71 at its lower end and a slot 72 immediately above the shelf through which a lip 73 on the extension 68 is projected to overlie the shelf.

The extension 68 of strip 66 is preferably formed of silver because of the highly conductive and non-corrosive qualities of such metal, and in order to avoid expense of construction of the entire strip from the more expensive material.

Lying against the face of the body strip 70 opposite the conductor strip 66 is a clamp strip 74 adapted for adjustment on the body strip by a pin 75 extending through a slot 76 for retaining the clamp strip on the body strip and having a head 77 for retaining the clamp strip on the body strip, and a cam member 78 having a shank 79 rotatable in apertures 80 and 81 in the body and conductor strips, and an eccentric head 82 mounted in a circular aperture 83 in the clamp strip; the cam pin being retained on the hanger by a cotter pin 84 at one end and a head 85 at the other end provided with a handle 86, whereby the pin may be rotated to move the clamp strip longitudinally for thrust against a plate 87 seated on the lip 71 of the conductor strip and to release the plate by movement of the clamp strip in the opposite direction.

Extending through the upper end of the body strip 70 to conductive relation with the conductor strip 66 is a terminal post 88 preferably attached to the conductor strip by riveting as at 89, and having a head 90 at its outer end. Fixed to the post 88 in contact with the body strip is a washer 91, and slidable on the post at the outside of the washer 91 is a second washer 92 urged toward the first by a coil spring 93 bearing against the washer 92 and against a washer 94 retained on the post by the head 90; the washers 91 and 92 being of conductive material and adapted to receive the slotted clip 95 of a circuit wire 96 therebetween when the washers are spread by projection of the clip over the post and between the washers against the tension of the spring 93.

The hangers 65 are arranged in pairs on the respective rods 64 for supporting the plate to be etched at its four corners; adjustability of the rods on the frame 55 and of the hangers 65 on the rods adapting such elements for support of plates of different dimensions within the tank.

The frame 55 is rockable to alternately tilt the suspended plate in opposite directions by means of an arm 97 attached to one of the side rails of the frame, and having a cam slot 98 in which a pin 99 on a side rail of the agitator supporting frame is projected, so that when the agitator supporting frame is reciprocated the pin moves through the slot and effects a rocking action of the plate supporting frame.

The wires 96, through which current is supplied to a plate immersed in the etching solution, run through a conduit 100 mounted on the bench 1 to series connection with the generator circuit 101 including a switch 102, a voltmeter 103, an ammeter 104 and a rheostat 105, all mounted on a switch board 106 attached to the bench and extending alongside the treating tank. The motor 37 for operating the reciprocating agitator and rocking plate hanger frames is operated through a circuit 107 tapped into the lead wires 108, 109, of a lighting or other circuit from which current is drawn for operating the generator motor 8; the small motor circuit having a switch 110 and rheostat 111 also mounted on the switch board 106, so that all of the electrical controls are in convenient reach of the person conducting the etching operation. The generator illustrated is self-excited but could be separately excited without altering its function.

The tank 10 is provided with a skirt 112 for protecting the motor and generator from solution that may be splashed from the tank, the conduit 100 for the positive lead wires 96 being provided with a rack 113 for suspending said wires out of the way of the operator when disconnected from the plate hangers, and other details of structure for convenience in operation of the apparatus, but not necessarily included in the invention, may be included in the apparatus.

The etching solution may be of any formula known in the art.

Assuming the parts of the apparatus to be constructed as described, with the tank and its directly connected parts, the motor and generator assembled on the bench and the tank filled to a desired depth with suitable etching solution, a plate to be etched is assembled on its hangers, the hanger supporting rods selectively positioned on their frame and the plate suspended in the solution by application of the hangers to the rods. The positive wires 96 are then conductively connected with the hangers by projection of their clips between the washers of the sockets on the hangers and the apparatus placed in operation by throw of the secondary motor and generator switches. Current then passing through the solution from the plate, acting as an anode, to the exposed protuberances of the bottom of the tank, acting as cathodes, energizes the solution to constitute it an electrolyte.

This electrolyte, acting on exposed surfaces of the plate, decomposes such exposed surfaces, and as the agitator moves back and forth beneath the plate the electrolyte is washed against the plate with a jet action induced by the angling bars that extend transversely between the rails of the agitator frame, thereby flushing the decomposed material from the exposed surfaces and removing such material from the etching area so that constantly fresh electrolyte is applied to the plate without interference from the removed decomposed particles.

Simultaneously with reciprocation of the agitator the plate is tilted first in one direction and then in the other so that as the agitator moves forwardly relatively to the plate, the jets induced by the agitator may have more direct contact with the plate than if the latter remained stationary and in a plane parallel with the agitator. The material dissociated from the plate falls by gravity through the agitator into the sumps in the bottom of the tank and passes from the sumps into the side troughs so that substantially pure electrolyte is constantly available for application to the plate.

I have found that by thus agitating the solution to wash the plate a much more rapid and cleaner etching is effected than by movement of the plate through the solution, and that the time and quality factors are enhanced by jetting of the solution and tilting of the plate, whereby the more positive and direct application of the solution to the plate and removal of dissociated particles from the region of the plate is effected.

What I claim and desire to secure by Letters Patent is:

1. Apparatus of the character described including a tank for containing electrolyte, means for supporting a plate to be etched submerged face downward in the electrolyte, means for moving said plate supporting means to vary angular positions of the plate, means for passing an electrical current through the plate and electrolyte to effect dissociation of particles from the plate, a plurality of blades mounted for reciprocation beneath the plate, and means for reciprocating the blades for agitating the electrolyte and washing dissociated particles from the plate.

2. Apparatus of the character described including a tank for containing electrolyte, means for holding a plate to be etched submerged in the electrolyte, means for passing an electrical current through the plate and electrolyte to effect dissociation of particles from the plate, and means for agitating the electrolyte beneath the plate including a frame, a series of paired, upwardly inclined blades carried by the frame and an actuator for reciprocating the frame.

3. Apparatus of the character described including a tank for containing electrolyte, means for holding a plate to be etched submerged in the electrolyte, means for passing an electrical current through the plate and electrolyte to effect dissociation of particles from the plate, and means for agitating the electrolyte beneath the plate including a frame, a series of paired, upwardly converging blades carried by the frame and an actuator for reciprocating the frame.

4. Apparatus of the character described including a tank for containing electrolyte, reciprocatory and rockable frames mounted on the tank, means on the rockable frame for supporting a plate within the tank, an agitator suspended from the reciprocating frame, and cam connection between the frames for reversing inclination of a plate carried by the rocking frame coincidently with change of direction of travel of the agitator.

5. Apparatus of the character described including a tank for containing electrolyte, means for holding a plate to be etched submerged in the electrolyte, means for passing an electrical current through the plate and electrolyte to effect dissociation of particles from the plate, an agitator mounted for reciprocation adjacent the plate, means for reciprocating the agitator for agitating the electrolyte and washing dissociated particles from the plate, and means for tilting the plate relative to the agitator in response to reciprocation of said agitator.

6. Apparatus of the character described including a tank, means for supporting a plate to be etched within an electrolyte contained by the tank, and a member reciprocable in the electrolyte in a path substantially parallel with the plate, including blades inclined to the path of said member for directing currents of the electrolyte to flushing contact with the plate in response to reciprocation of said member in the bath.

7. Apparatus of the character described including a tank, means for supporting a plate to be etched within an electrolyte contained by the tank, and a member reciprocable in the electrolyte in a bath substantially parallel with the plate, including a plurality of series of pairs of blades, the blades of each pair converging in the direction of the plate and spaced to provide jet openings for directing currents of the electrolyte to flushing contact with the plate in response to reciprocation of said member in the bath.

8. Apparatus of the character described including a tank, a hanger for suspending a plate to be etched within an electrolyte contained by the tank, an agitator reciprocable within the electrolyte beneath the plate, means mounting said hanger in the tank for rocking movement about an axis of oscillation to vary inclination of the plate relatively to said agitator, and means for simultaneously rocking the hanger and reciprocating the agitator in opposite directions.

LOUIS E. HOLLAND.